(12) United States Patent
Zuzga et al.

(10) Patent No.: US 7,845,723 B2
(45) Date of Patent: Dec. 7, 2010

(54) ELECTRICAL DOCKING STATION

(75) Inventors: Matthew Zuzga, Macomb, MI (US); Glenn Karbowski, Belle River (CA)

(73) Assignee: Lear Corporation, Southfield, MI (US)

( * ) Notice: Subject to any disclaimer, the term of this patent is extended or adjusted under 35 U.S.C. 154(b) by 1392 days.

(21) Appl. No.: 11/164,863

(22) Filed: Dec. 8, 2005

(65) Prior Publication Data

US 2007/0132288 A1  Jun. 14, 2007

(51) Int. Cl.
A47C 7/62 (2006.01)

(52) U.S. Cl. .................................................. 297/217.3

(58) Field of Classification Search ............. 297/217.3, 297/180.14, 180.13, 330, 344.17, 452.42; 361/730, 600, 679.01, 728
See application file for complete search history.

(56) References Cited

U.S. PATENT DOCUMENTS

| 5,337,995 | A | * | 8/1994 | Satoh et al. | ................. 248/429 |
| 5,703,754 | A | * | 12/1997 | Hinze | .......................... 361/736 |
| 5,709,363 | A | * | 1/1998 | Matsuhashi | .................. 248/421 |
| 5,751,129 | A | * | 5/1998 | Vergin | ......................... 318/467 |
| 5,866,862 | A | * | 2/1999 | Riffil et al. | ................... 200/5 R |
| 6,076,877 | A | * | 6/2000 | Krieg et al. | ................ 296/37.1 |
| 6,107,696 | A | | 8/2000 | Peter et al. | |
| 6,652,312 | B2 | * | 11/2003 | Liegl et al. | ................... 439/519 |
| 2003/0057749 | A1 | * | 3/2003 | Buono | ....................... 297/217.3 |
| 2004/0012226 | A1 | | 1/2004 | Morrison et al. | |
| 2005/0141230 | A1 | | 6/2005 | DeLine et al. | |

* cited by examiner

*Primary Examiner*—David Dunn
*Assistant Examiner*—Tania Abraham
(74) *Attorney, Agent, or Firm*—MacMillan, Sobanski & Todd, LLC

(57) ABSTRACT

An electrical docking station for attachment to a vehicle seat. A variety of different modules each including circuitry for performing certain seat functions can be removably attached to the docking station. The docking station includes a connector plate for connecting the wires from the modules to the seat, as well as an attachment mechanism for mechanically attaching the docking station to the seat.

22 Claims, 3 Drawing Sheets

ELECTRICAL DOCKING STATION

TECHNICAL FIELD

The present invention generally relates to an electrical docking station used in association with an automobile. The present invention more particularly relates to an electrical docking station that is attached to a seat in a vehicle.

BACKGROUND OF THE INVENTION

It is well known that seats in automotive vehicles include many features. Not only do seats simply move back and forth, they also have the ability to move up and down, contain individual heaters, and have individualized lumbar support, just to name a few. In today's vehicles many of these features are electronically controlled. Since each feature requires a power source and unique supporting electrical and mechanical hardware to perform its function there is extensive circuitry and wiring required that runs throughout each seat.

It is known that each function requires an individual module that contains circuitry for performing it's associated function. These modules are individually attached to the seat. Currently there is no uniformity in the placement of each module within the seat. This results in modules being positioned randomly within the seat wherever there is available space.

Another problematic issue involves the wiring required for the modules. Currently, the wires running throughout the seat are contained within conduits attached directly to the seat structures and routed wherever there is available space. Also, there is no uniformity in the placement or attachment points of the wires needed for the modules.

As a result, there are several problematic issues that result from the known configuration and assembly of seats having multiple electronically controlled functions. The lack of uniformity from seat to seat results in inefficient assembly leading to unnecessary increased labor and costs.

SUMMARY OF THE INVENTION

The present invention addresses these issues by providing an electrical docking station that has the ability to store multiple modules where each module contains circuitry for performing a certain seat function. Further, the electrical docking station protects the wires needed for each module from moving objects within the seat and the docking station easily and uniformly attaches mechanically and electrically to the seat during the assembly process. The wires are protected from movable mechanisms associated with the seat, as well as the movability of the seat itself. Yet another benefit of the present invention is that the length of the wires can also be reduced since all of the modules are located in one centralized location.

The electrical docking station of the present invention consolidates the electronic systems of the seat into one location and provides the flexibility to expand without affecting the overall seat design. The end result is improvement with respect to warranty, assembly and overall cost, while providing a compact device that will contain all electronic systems.

More specifically, the electrical docking station of the present invention includes a base trough including a channel, an attachment mechanism for mechanically attaching the base trough to the automotive seat, at least one module attached to the base trough containing circuitry for performing a desired seat function including wires that are received within the trough channel, and a connector plate that is movable with respect to the base trough to assist with providing a wire connection attaching the base trough to the automotive seat.

BRIEF DESCRIPTION OF THE DRAWING

The present invention will be described by way of example with reference to the following drawings.

DETAILED DESCRIPTION OF THE PREFERRED EMBODIMENT

Figure 1:
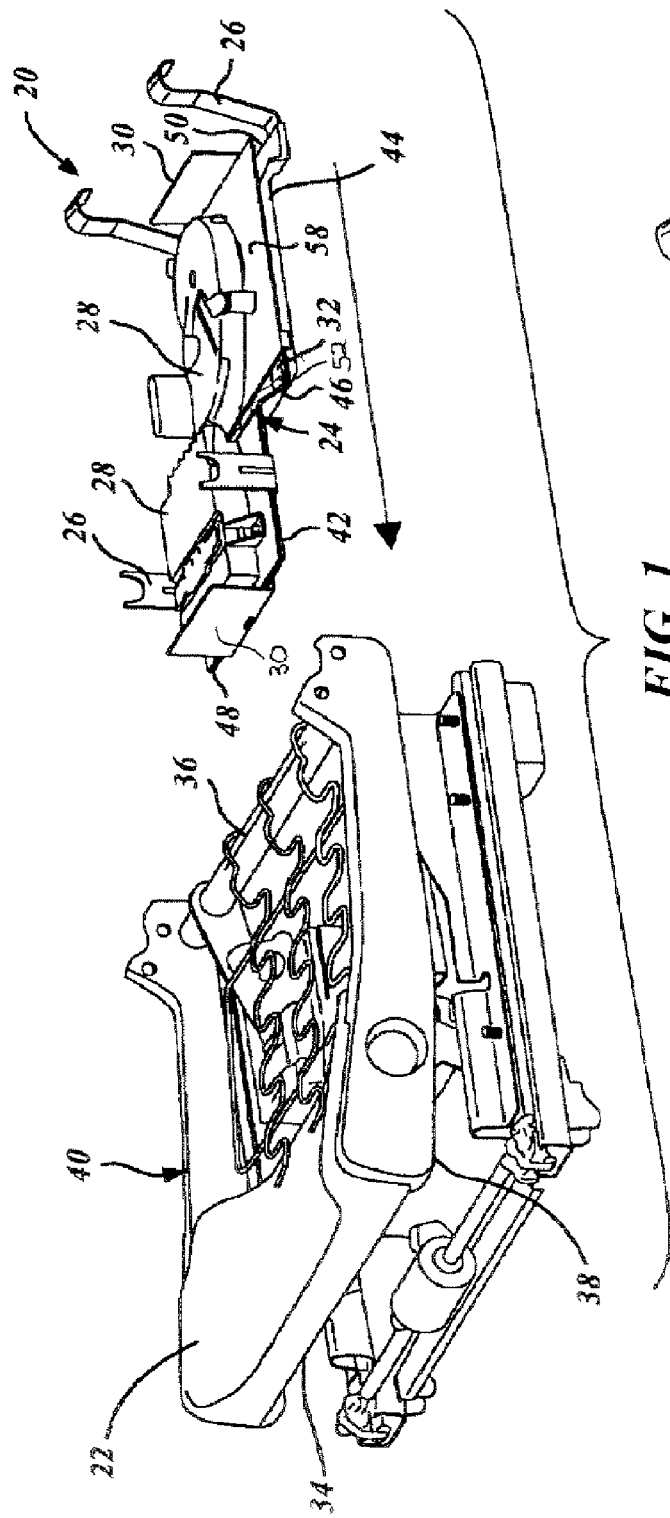
FIG. 1 illustrates an expanded perspective view of an automotive seat and an embodiment of an electrical docking station in accordance with the present invention.
Figure 4:
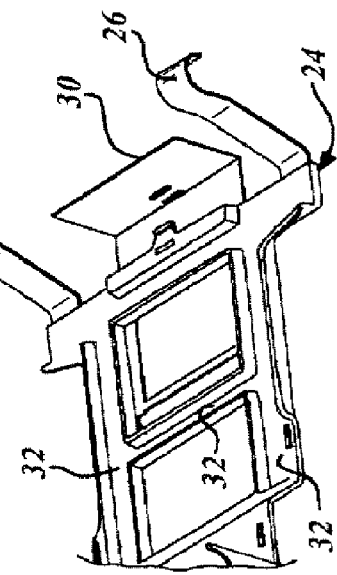
FIG. 4 illustrates a perspective view of a base trough and a connector plate in the extended position.
Figure 2:
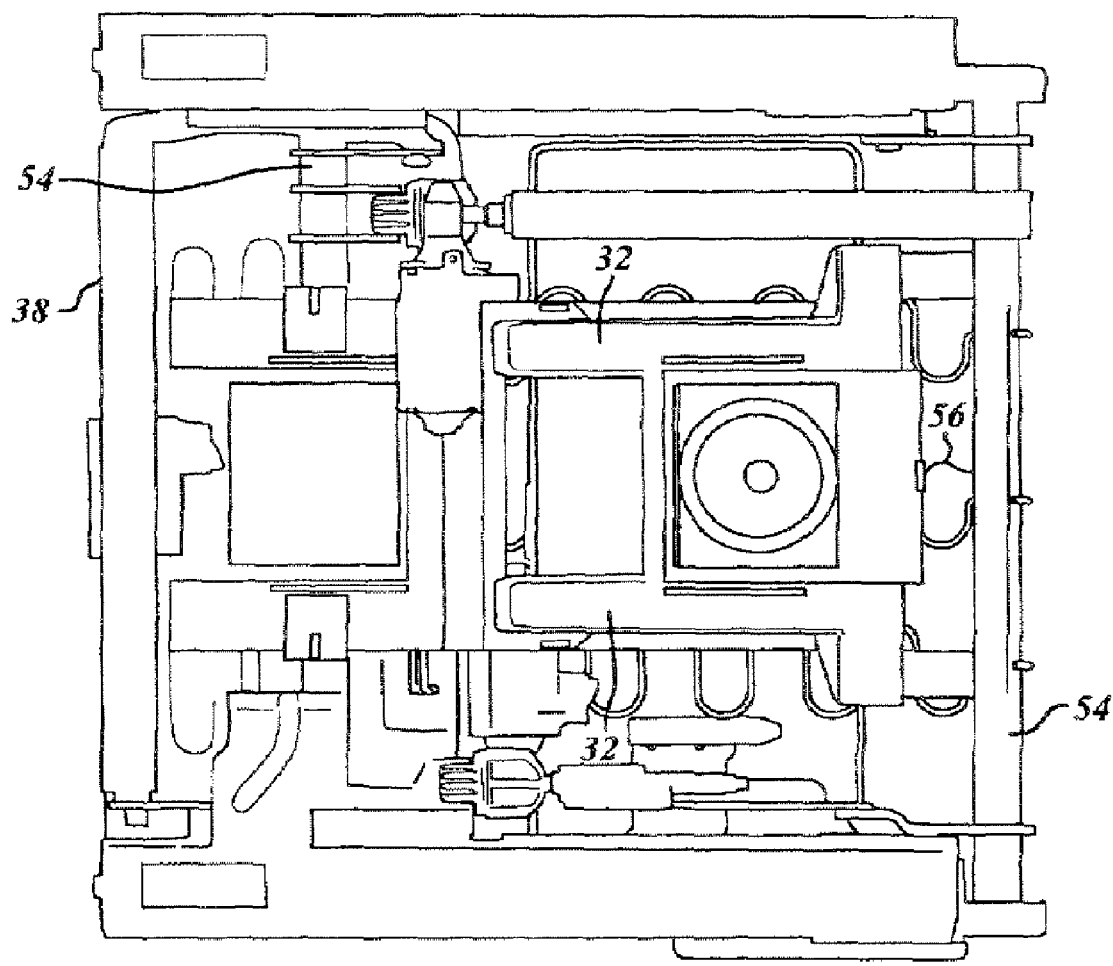
FIG. 2 illustrates a bottom view of an automotive seat including an electrical docking station in accordance with the present invention.

Referring to FIGS. 1 and 2, the electrical docking station of the present invention, shown generally at 20, is attached to an automotive seat 22. FIG. 1 illustrates the seat cushion pan 40 of the automotive seat. The upright portion or back of the seat is not shown. The front of the seat cushion pan is shown at 34 while the rear of the seat cushion pan is shown at 36. The upright portion of the seat, while not illustrated, would be attached to the rear of the seat cushion pan 36. The electrical docking station 20 of the present invention is attached to the underside portion of the seat cushion pan 38.

In general, the electrical docking station 20 includes a base trough 24, at least one module 28 containing circuitry for performing a desired seat function that is attached to the base trough 24, an attachment mechanism 26 for mechanically connecting the docking station to the seat, and a connector plate 30 for electrically connecting the docking station 20 to the seat 22.

The base trough 24 depicted in the attached figures includes a first tier 42, a second tier 44 and an angled wall member 46 connecting the first and second tiers 42, 44.

The first end 48 of the base trough 24 is located on the first tier 42 at the point farthest away from the angled wall 46 and the second end 50 of the base trough 24 is located on the second tier 44 at the point farthest away from the angled wall 46. When installed in place, the first end 48 is positioned generally near the front of the seat cushion pan 34 while the second end 50 is positioned generally near the rear of the seat cushion pan 36.

Figure 5:
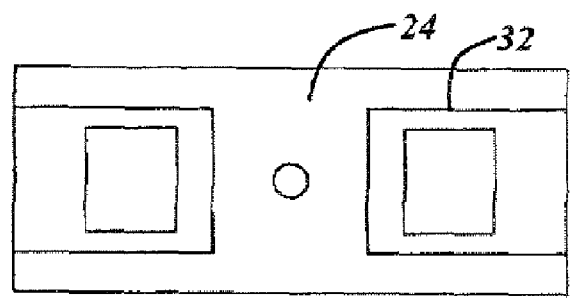
FIG. 5 illustrates a bottom view of a flat base trough.
Figure 6:
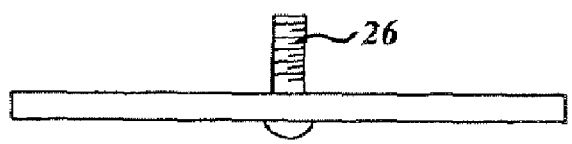
FIG. 6 illustrates a side view of the flat base trough illustrated in FIG. 5.

This multi-tier design is used to maximize the amount of storage area beneath the seat 22. Two important factors that influence this design are the contour of the underside 38 of the seat and the contour of the floor of the vehicle beneath the underside of the seat. Although FIGS. 1-4 depict the first tier 42 in a higher position relative to the second tier 44, it could be designed the opposite way, depending on the specific configuration of the seat. In another embodiment it could be a single tier or flat, as illustrated in FIGS. 5 and 6.

The trough 24 includes at least one channel 32 for receiving the wires 52 from the modules 28. The channels 32 can be included on the first tier 42, the second tier 44 and the angled wall 46. Wires 52 from the modules 28 fit within the channels 32 to protect them from moving components within the seat. The channels 32 aide in routing the wires 52 to the connector plate 30 and protect the wires 52 from moving objects within the seat.

Figure 3:
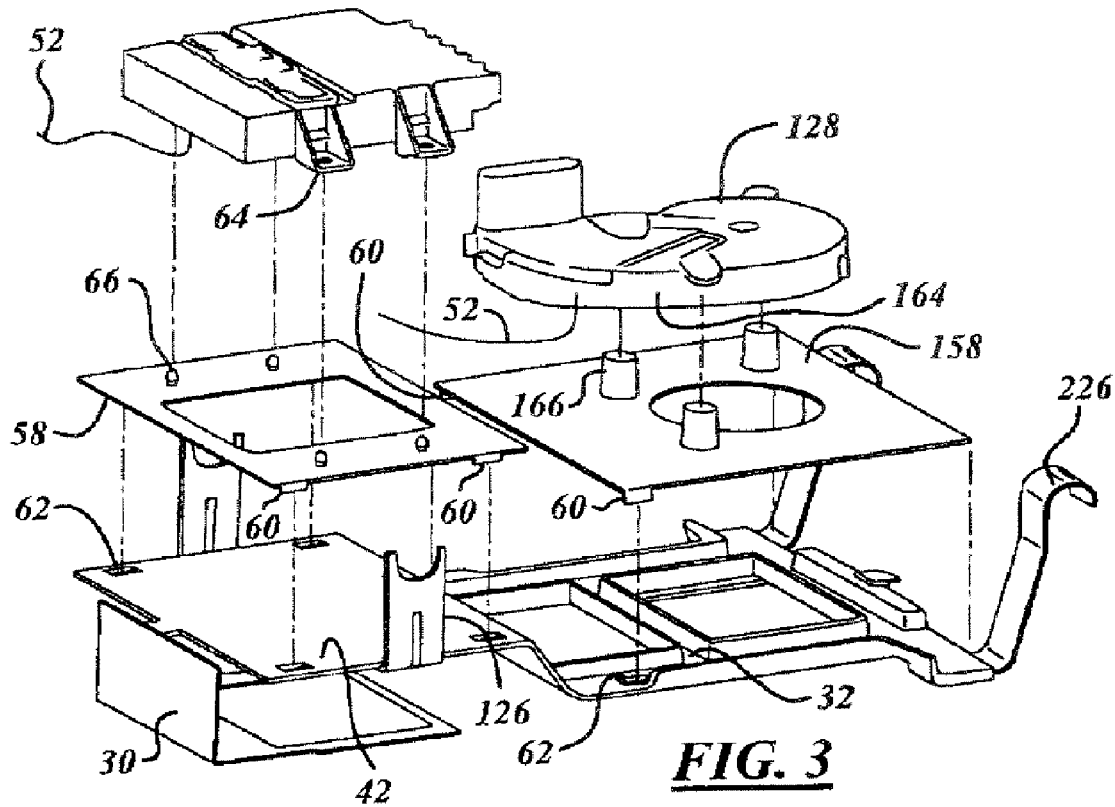
FIG. 3 illustrates an expanded perspective view of an electrical docking station in accordance with the present invention including two modules.

The attachment mechanism 26 mechanically connects the base trough 24 to an automotive seat 22. The attachment mechanism 26 can include a variety of different connections. For example, the attachment mechanism 26 may include, but is not limited to, hooks, snaps, screws or any combination thereof. More specifically, the attachment mechanism 26 illustrated in the drawings includes two different types of connections. Connected to the first tier 42 of the trough 24, as shown in FIGS. 2 and 3, are two arms 126 that extend out from the base trough 24 and snap onto a cross member 54 on the underside of the seat 38. Also, connected to the second tier 44 of the trough 24 are two arms 226 that extend out from the base trough 24, each with a hook for attachment to a cross member 54 on the underside of the seat 38.

The connector plate 30 is attached to the base trough 24 and provides a mechanical and an electrical or wire connection for attaching wires 52 from the modules 28 to the seat 22. The connector plate 30 is attached to and movable with respect to the base trough 24. More specifically, the connector plate 30 is slidable with respect to the base trough 24 and slides between a closed position and an opened position. When in the closed position the connector plate 30 is positioned adjacent to the base trough 24. However, when in the opened position the connector plate 30 is fully extended away from the base trough 24.

When the connector plate 30 is in the closed position it is locked adjacent to the base trough 24. When the connector plate 30 is in the opened position during the seat assembly process, the electrical connection between the wires 52 from the modules 28 to the wires 56 in the seat 22 can be made. Once the wires 52, 56 are connected the connector plate 30 slides back to its closed position and is locked in place.

In an alternative embodiment, as illustrated in FIGS. 1 and 2, there are two connector plates 30. In some instances there could be three or more connector plates. Therefore, the wires are routed through the channels to the appropriate connector plate for its particular module. All of the connector plates 30 are slidable with respect to the base trough 24.

The electrical docking station 20 also includes an interface plate 58 that is attached to and positioned between the base trough 24 and a module 28. There is one interface plate 58 for each module 28. The interface plate 58 has a standard attachment configuration for attachment to the base trough 24. However, there are a variety of different configurations for attachment to its associated module 28. The reason is to accommodate the design of preexisting modules without having to alter their design in order to be attached to the base trough. Rather, an interface plate 58 is used that allows any module 28 to be attached to the base trough 24.

The one commonality is that all of the modules 28 will snap fit into place onto its associated interface plate 58 and the interface plate 58 will snap fit into its place on the base trough 24. Since all of these components can be made from plastic they are designed and manufactured to snap fit together.

As illustrated in FIG. 3, each interface plate 58 includes projections 60 and the base trough 24 includes apertures 62 that are aligned with the interface plate projections 60 for receiving the interface plate projections 60. In one embodiment, the module 28 that attaches to the first tier 42 includes projections 64 and the interface plate 58 includes apertures 66 that are aligned with the module projections 64 for receiving the module projections 64. However, the module 128 that attaches to the second tier 44 includes apertures 164 and the interface plate 158 includes projections 166 that are aligned with the module apertures 164. The module apertures 164 receive the interface plate 158 projections 166. These sets of aligned projections and apertures allow the components to snap fit together.

There are a variety of modules 28 used in association with the electrical docking station 20. Each module 28 contains circuitry for performing a certain seat function. Some of the modules include, but are not limited to, a heat/cool module, a seat suppression module, a heat/cool blower module, and a memory module. Further, there can be multiple modules 28 attached to a single base trough 24.

Figure 7:
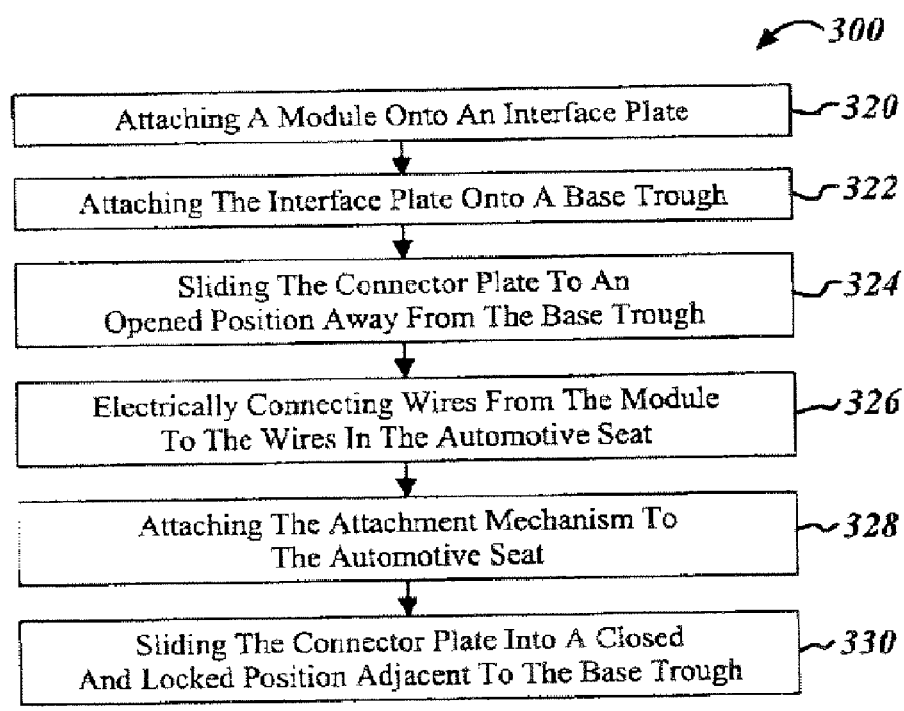
FIG. 7 illustrates a flowchart representing a method of attaching an electrical docking station in accordance with the present invention to an automotive seat.

Also disclosed is a method of attaching the electrical docking station to the automotive seat, as illustrated in FIG. 7 at 300. The method includes the steps of attaching a module onto an interface plate at 320. Then the interface plate is attached to the base trough at 322. The connector plate slides out and away from the base trough at 324. The wires from the module are then electrically connected to the wires in the seat at 326. The attachment mechanism is mechanically attached to the seat to secure the docking station to the seat at 328. Finally the connector plate slides back in toward the base trough and locked in a closed position, adjacent to the base trough at 330.

While the present invention has been described in what is presently considered to be its most practical and preferred embodiment or implementation, it is to be understood that the invention is not to be limited to the disclosed embodiment. On the contrary, the present invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrical docking station for attachment to a seat comprising:
    a base trough including a channel;
    an attachment mechanism for mechanically attaching said base trough to a seat;
    a module for performing a desired function of the seat, said module including wires that are received within said channel;
    an interface plate attached to and positioned between said base trough and said module, said interface plate including projections and said base trough including apertures aligned with said interface plate projections for receiving said interface plate projections; and
    a connector plate that is connected to said wires of said module, is supported on said base trough for movement relative thereto, and is adapted to mechanically and electrically connect said module to the seat.

2. The electrical docking station of claim 1 wherein said module includes projections and said interface plate includes apertures aligned with said module projections for receiving said module projections.

3. The electrical docking station of claim 1 wherein said base trough is adapted to be attached to an underside of the automotive seat.

4. The electrical docking station of claim 1 wherein said attachment mechanism includes hooks that are adapted to attach to the seat.

5. The electrical docking station of claim 1 wherein said attachment mechanism includes snap members that are adapted to attach to the seat.

6. The electrical docking station of claim 1 wherein said attachment mechanism includes a screw that is adapted to attach to the seat.

7. The electrical docking station of claim 1 wherein said module includes circuitry for performing a certain seat function.

8. The electrical docking station of claim 7 wherein said module is a heat/cool module.

9. The electrical docking station of claim 7 wherein said module is a seat suppression module.

10. The electrical docking station of claim 7 wherein said module is a heat/cool blower module.

11. The electrical docking station of claim 7 wherein said module is a memory module.

12. The electrical docking station of claim 1 wherein said connector plate is slidable with respect to said base trough and slides between a closed position and an opened position, wherein when in said closed position said connector plate is locked adjacent to said base trough and when in said opened position said connector plate is fully extended away from said base trough.

13. The electrical docking station of claim 1 wherein there are at least two modules attached to said base trough.

14. The electrical docking station of claim 1 wherein said base trough includes a first tier, a second tier and an angled wall connecting said first tier and said second tier.

15. A multi-function automotive seat comprising:
an automotive seat including a seat cushion pan, wiring that runs throughout said seat for performing seat functions and cross members on an underside of the seat cushion pan;
an electrical docking station attached to said automotive seat wherein said electrical docking station includes;
a base trough including a first tier, a second tier, an angled wall connecting said first tier and said second tier, and a channel in said first tier, said second tier and said angled wall;
an attachment mechanism mechanically attaching said base trough to said cross members of said seat;
a first interface plate attached to said base trough first tier;
a second interface plate attached to said base trough second tier;
a first module containing circuitry to perform a first seat function that is attached to said first interface plate and includes wiring that is received within said base trough channel;
a second module containing circuitry to perform a second seat function that is attached to said second interface plate and includes wiring that is received within said base trough channel; and
a connector plate that is supported on said base trough for movement relative thereto and that electrically connects said wires from said modules to said seat wiring.

16. The multi-function automotive seat defined in claim 15 wherein said first interface plate includes projections and said base trough first tier includes apertures aligned with said first interface plate projections for receiving said first interface plate projections.

17. The multi-function automotive seat defined in claim 16 wherein said first module includes projections and said first interface plate includes apertures aligned with said first module projections for receiving said first module projections.

18. The multi-function automotive seat defined in claim 15 wherein each of said first and second interface plates includes projections and each of said base trough first and second tiers includes apertures aligned with said first and second interface plate projections for respectively receiving said first and second interface plate projections.

19. The multi-function automotive seat defined in claim 18 wherein each of said first and second modules includes projections and each of said first interface plates includes apertures aligned with said first and second module projections for respectively receiving said first and second module projections.

20. An electrical docking station for attachment to a seat comprising:
a base trough including a channel;
an attachment mechanism for mechanically attaching said base trough to a seat;
a module for performing a desired function of the seat, said module including wires that are received within said channel;
an interface plate attached to and positioned between said base trough and said module; and
a connector plate that is connected to said wires of said module, is supported on said base trough for movement relative thereto, and is adapted to mechanically and electrically connect said module to the seat, said connector plate being slidable with respect to said base trough between a closed position and an opened position, wherein when in said closed position said connector plate is locked adjacent to said base trough and when in said opened position said connector plate is fully extended away from said base trough.

21. The multi-function automotive seat defined in claim 20 wherein said interface plate includes projections and said base trough includes apertures aligned with said interface plate projections for receiving said interface plate projections.

22. The multi-function automotive seat defined in claim 21 wherein said module includes projections and said interface plate includes apertures aligned with said module projections for receiving said module projections.

* * * * *